E. W. SMITH.
STORAGE BATTERY.
APPLICATION FILED DEC. 31, 1913.

1,196,817.   Patented Sept. 5, 1916.

WITNESSES:

INVENTOR
Edward Wanton Smith
BY
ATTORNEY.

UNITED STATES PATENT OFFICE.

EDWARD WANTON SMITH, OF PHILADELPHIA, PENNSYLVANIA.

STORAGE BATTERY.

1,196,817.  Specification of Letters Patent.  Patented Sept. 5, 1916.

Application filed December 31, 1913. Serial No. 809,632.

*To all whom it may concern:*

Be it known that I, EDWARD WANTON SMITH, a citizen of the United States, residing at Philadelphia, in the county of Philadelphia and State of Pennsylvania, have invented certain new and useful Improvements in Storage Batteries, of which the following is a specification.

Trouble has been experienced in the use of positive pole plates having rubber retainers arranged against the peroxid active material. I have discovered that this trouble is due to some chemical action that takes place, in use, between the peroxid and the hard rubber material or composition of the retainer and that chemically inert material, as lamp black, prevents or minimizes this action, but if incorporated into the hard rubber material it weakens the retainers and renders them brittle and unfit for use. I obviate these defects and disadvantages by means of a composite retainer, one part of which consists of the usual or regular hard rubber material, and the retaining wall of which consists of a mixture of that hard rubber material and chemically inert material, as finely divided lamp black. The parts of the retainer in combination provide not only the necessary resistance to chemical action for preventing or minimizing the destructive or corrosive action between the retainer and the peroxid to which reference has been made, but also the necessary mechanical strength for withstanding the usage to which the plate is necessarily subjected.

The invention will be claimed at the end hereof but will be first described in connection with the embodiments of it chosen for illustration in the accompanying drawings in which—

Figure 1:
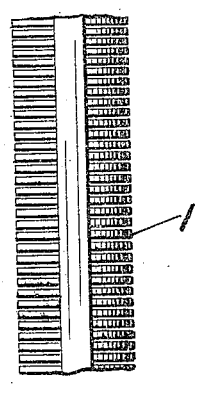
Figure 2:
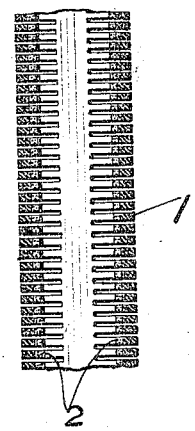
Figure 3:
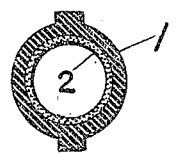
Figure 4:
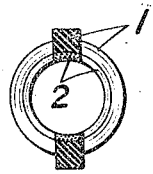
Figure 5:

Figure 1, is a side view of a tube embodying features of the invention. Fig. 2, is a vertical central section of the same. Figs. 3 and 4, are horizontal sections taken respectively through a ring between slits and through one of the slits, and Fig. 5, is a sectional view illustrating a modification.

The outside part 1, of the composite tube consists of hard rubber composition or relatively pure high grade vulcanite. This is possessed of the requisite mechanical strength and by reason of its location on the outside of the tube and away from the peroxid or active material or material to become active, there is little or no tendency to chemical or destructive action. The inner part 2, is chemically inert although somewhat brittle and lacking in mechanical strength. It consists of a hard rubber composition containing a large admixture of chemically inert material, as lamp black. For example, as much as one-half of it may be finely divided lamp black, but the proportions may be widely varied. The inner and the outer parts or walls of the tube may well be integral. By the combination of the mechanically strong outer part and the chemically inert though brittle inner part, the tubes satisfactorily fulfil the requirements in the batteries of the kind specified and make those batteries more enduring than heretofore although such batteries are in comparison with many others very enduring even without the present invention but by the latter their life is greatly prolonged.

The invention is of course not limited to tubular plates with tubular retainers but is applicable to flat plates with flat retainers. In Fig. 5, $2^a$, are layers like the layers 2, above described, and they are shown as applied on each side of a layer $1^a$, like the layer 1, above described. The idea of using two inert layers $2^a$, is to insure that one of them shall come against the peroxid. Of course only one such layer is necessary. The advantages above described apply of course to the modification shown in Fig. 5.

What I claim is:

1. A composite tube for storage battery plates having its inner part of rubber material containing finely divided lamp black and its outer part of relatively pure hard rubber.

2. A composite tube for storage battery plates comprising an integral inner layer of rubber and chemically resistant material and its outer layer of strong tough rubber material.

3. A composite retainer for storage battery plates consisting of integral exposed layers of which one is of chemically resistant material and the other of strong and tough material.

4. A composite retainer for storage battery plates comprising integral layers one of rubber and finely divided inert material and the other of hard rubber.

5. A composite retainer for storage battery plates comprising a layer of hard rubber and a layer of hard rubber containing an admixture of finely divided inert material.

EDWARD WANTON SMITH.

Witnesses:
 Louis H. Flanders,
 Edgar L. Longaker.